United States Patent [19]

Kuge et al.

[11] Patent Number: 5,707,433
[45] Date of Patent: Jan. 13, 1998

[54] PIGMENT INKS FOR INK JET PRINTERS

[75] Inventors: Ishio Kuge; Shiro Mori; Estuo Ikemoto, all of Hyogo, Japan

[73] Assignee: Fuji Pigment Co., Ltd., Hyogo Pref., Japan

[21] Appl. No.: 745,267

[22] Filed: Nov. 8, 1996

[51] Int. Cl.⁶ ............................................. C09D 11/02
[52] U.S. Cl. .................. 106/31.86; 106/31.9; 106/31.75
[58] Field of Search ............................. 106/20 R, 23 R, 106/20 C, 31.75, 31.86, 31.9

[56] References Cited

U.S. PATENT DOCUMENTS

| | | | |
|---|---|---|---|
| 4,509,982 | 4/1985 | Iijima | 106/23 B |
| 4,629,748 | 12/1986 | Miyajima et al. | 106/20 A |
| 4,954,174 | 9/1990 | Imagawa | 106/30 R |
| 5,318,617 | 6/1994 | Nagasawa et al. | 106/20 A |
| 5,538,548 | 7/1996 | Yamazaki | 106/20 C |
| 5,538,549 | 7/1996 | Kato et al. | 106/20 C |

FOREIGN PATENT DOCUMENTS 116678  5/1987  Japan.

*Primary Examiner*—Helene Klemanski
*Attorney, Agent, or Firm*—Collard & Roe, P.C.

[57] ABSTRACT

A pigmented ink for ink jet printer which comprises pigment particle as a colorant, water or a mixture of water and at least one hydrophilic organic solvent as a carrier medium and a derivative of polyoxyethylene ether sulphate or a derivative of polyoxyethylene ether phosphate as a dispersant. These inks give images having good print quality and excellent storage stability after many thermal cycles of −20° C. to 80° C.

8 Claims, No Drawings

PIGMENT INKS FOR INK JET PRINTERS

BACKGROUND OF THE INVENTION

1. Field of the Invention

The present invention relates to pigmented inks for ink jet printers, and more particularly, to aqueous pigmented inks wherein the pigment dispersant is a derivative of polyoxyethylene ether phosphate or a derivative of polyoxyethylene ether sulphate.

2. The Prior Art

Ink jet printing is a non-impact method and there are many kinds of printing which differ according to their ink jetting method such as bubble, thermal and piezoelectric type. In all types of printers, recordings are made through a fine (10 microns to 50 microns) injection nozzle. Currently, inks for jet printers are widely used which comprise colorants such as dyes or pigments, water, hydrophilic solvents and dispersants.

As a colorant, a pigment is superior to a dye in water resistance and weather resistance, because the pigments are used as particles dispersed in a medium and the dyes are used in molecular state solution.

Ink jet printers involve the mechanism that the inks are injected through fine nozzles. Therefore, a fine particle size pigment dispersion is necessary. The pigment particles flock together more strongly as the particle size decreases to smaller sizes. So it is difficult to maintain a good dispersion state with very small sized particles. If the pigment ink for the ink jet printer does not have a good dispersion stability and an excellent storage stability, the injection nozzle will become clogged or the printed image will become blurred.

The inks are now required to meet the demanding needs of all kinds of printers. The demanding needs are as follows: good print quality, water and smear resistance, lightfastness, stability both in storage and in the printer, having good dispersion stability after five thermal cycles of −22° C./80° C.

SUMMARY OF THE INVENTION

It is an object of the present invention to provide a pigment ink having properties suited for use in all types of printers to meet the demanding requirements.

The inks according to the invention are aqueous dispersions of pigment particles stabilized by a dispersant, that are stable over long periods both in storage and in the printer, especially after many thermal cycles of −22° C./80° C. The inks may be adapted to the requirements of all kinds of printers to provide a balance of light stability, smear resistance, viscosity, surface tension, high optical density. Resulting printed images are of high quality in that the individual ink dots are round with sharp edges and there is little bleeding or feathering of the ink dots.

The present invention is directed to a pigmented ink composition comprising an aqueous carrier medium; and pigment particles stabilized in the aqueous carrier medium by a dispersant selected from the group consisting of a derivative of polyoxyethylene ether phosphate and a derivative of polyoxyethylene ether sulphate.

More particularly, the pigmented ink composition comprises from 1.5% to 5% by weight, preferably from 2% to 4% by weight of pigment particles; from 1% to 3% by weight, preferably from 1.5% to 2.5% by weight of preservative; from 1% to 2% by weight, preferably from 1% to 1.5% by weight of dispersant; from 0.1 to 0.5% by weight, preferably from 0.1% to 0.3% by weight of pH adjuster; from 20% to 30% by weight, preferably from 22.8% to 28% by weight of hydrophilic organic solvent; from 60% to 75% by weight, preferably from 67.6% to 73.3% by weight of water; wherein each weight percent is based upon the total weight of the composition.

The pH adjuster can be an aqueous solution of ammonia, or an aqueous solution of sodium hydroxide, or any other suitable base which will raise the pH level of an aqueous solution.

In addition the pigmented ink composition has a surface tension of 43 to 46 dynes/cm, a viscosity at 25° C. of 1.8 to 2.3 cp, and a pH of 8.5 to 8.8.

In the present invention, the dispersant used can be of two specific kinds:

The first type of dispersant is a derivative of polyoxyethylene ether phosphate having the formula:

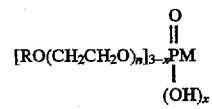

wherein R is an alkyl or alkenyl group having 2 to 24 carbon atoms, preferably from 6 to 20 atoms, or alkyl phenyl group having 8 to 20 carbon atoms, preferably from 10 to 15 atoms, in the alkyl chain, M is a base forming metal such as K,Na,Ca,Ba or a base such as $NH_3$, $RNH_2$, n is an integer from 2 to 25 and x is the integer 1 or 2.

The second type of dispersant is a derivative of polyoxyethylene ether sulphate having the formula

wherein R is an alkyl or alkenyl group having 10 to 20 carbon atoms, preferably from 12 to 16 carbon atoms, or alkyl phenyl group having 4 to 14 carbon atoms, preferably from 6 to 10 carbon atoms in the alkyl chain, M is a base forming metal such as K,Na,Ca,Ba, or a base such as $NH_3$, $RNH_2$, and n is an integer from 4 to 18.

The dispersant is used in an amount equal to 25% to 75% by weight based upon the weight of the pigment utilized.

A wide variety of organic pigments and inorganic pigments may be used to make the ink. The pigment particles are sufficiently fine to permit free flow of the ink through the ink jet printing device, especially at the ejecting nozzles that usually have a diameter ranging from 10 microns to 50 microns. The range of useful pigment particle size is approximately 0.005 to 15 microns, and preferably, it should range from 0.005 to 5 microns, and, most preferably useful pigment particle size is from 0.005 to 1 micron. The selected pigment may be used in dry or wet form.

Representative pigments that may be selected include, but are not limited to the following: carbon black, phthalocyanine, threne, azo, quinacridone, dioxazine, anthraquinone, indigo, thioindigo, azomethine, perylene, perynone, isoindorinone, titanium oxide, and other metal oxides.

The aqueous carrier medium can be water, or a mixture of water and a hydrophilic organic solvent.

Representative hydrophilic organic solvents that may be used include, but are not limited to the following: (1) alcohols such as ethanol, propanol, butanol, and cyclohexanol; (2) polyhydroxy alcohols such as ethylene glycol, diethylene glycol, tripropylene glycol and glycerol; (3) lower alkyl esters derived from alkylene glycols; (4) ethers such as ethylene glycol monomethyl ether or ethylene glycol monoethyl ether, or ethylene glycol monobutyl ether; ethylene glycol dimethyl ether or ethylene glycol diethyl ether or ethylene glycol dibutyl ether; triethyleneglycol monomethyl ether triethylene glycol monoethyl ether or triethylene glycol monobutyl ether; tripropyleneglycol monomethyl ether or tripropylene glycol monoethyl ether or tripropylene glycol monobutyl ether; and (5) alkanol amines such as monoethanol amine, diethanol amine, triethanol amine, N,N-dimethylethanol amine, aminoethyl ethanol amine, or morpholine.

Ink Preparation

The ink is prepared by premixing the selected pigment and the selected dispersant in aqueous carrier medium and then deflocculating the pigment. The deflocculating step may be accomplished in a ball mill, a sand grinder mill, a speedline mill, or a roll mill. It is desirable to make the pigmented ink in concentrated form, which is subsequently diluted to the appropriate concentration, viscosity, color strength or other quality. At the last stage, the ink is adjusted to the desired particle size by a filter or a centrifuge.

Other objects and features of the present invention will become apparent from the following Examples, which disclose the embodiments of the present invention. It should be understood, however, that the Examples are designed for the purpose of illustration only and not as a definition of the limits of the invention.

In Examples 1 to 4, the derivatives of polyoxyethylene ether phosphate were used as a dispersant.

EXAMPLE 1

The following ingredients were added in a ball mill and mixed and dispersed for 5 hours.

|  | Parts by Weight |
|---|---|
| First Step |  |
| Carbon black (MA-100 ® from Mitsubishi Chemical) | 30.0 |
| Polyoxyethylene laurylether phosphate (NIKKOL DLP-10 ®, from Nikko Chemicals) | 10.0 |
| Ethylene glycol | 28.0 |
| Deionized water | 80.0 |
| Preservative (PROXEL ® GXL from ICI) | 2.0 |
| SUBTOTAL | 150.00 |
| Second Step |  |

To this above first mixture, the following ingredients were added and then mixed. And then the black ink for a jet printer was prepared after removal of large pigment particles by a centrifuge. The pigment concentration was 3% by weight.

| Glycerol | 50.0 |
|---|---|
| Diethyleneglycol | 150.0 |
| 48% NaOH solution | 2.0 |
| Deionized water | 648.0 |
| TOTAL | 1000.0 |

EXAMPLE 2

Another black ink was prepared by utilizing a procedure analogous to that described in Example 1.

|  | Parts by Weight |
|---|---|
| First Step |  |
| Carbon black (RAVEN 1255 ®, from Columbian Carbon) | 30.0 |
| Polyoxyethylene nonylphenylether phosphate (PLYSURF A207H ®, from Dai-ichi Kogyo Seiyaku) | 10.0 |
| Ethylene glycol | 30.0 |
| Ammonia water | 2.0 |
| Deionized water | 80.0 |
| Preservative (PROXEL GXL ®, from ICI) | 2.0 |
| SUBTOTAL | 154.0 |
| Second Step |  |
| Glycerol | 200.0 |
| Propylene glycol | 50.0 |
| Deionized water | 596.0 |
| TOTAL | 1000.0 |

EXAMPLE 3

A yellow ink was prepared by utilizing a procedure analogous to that described in Example 1.

|  | Parts by Weight |
|---|---|
| First Step |  |
| C.I. Pigment Yellow 17 (SYMULAR ® fast Yellow RF from DaiNippon Ink) | 40.0 |
| Polyoxyethylene laurylether phosphate monoethanol amine (PLYSURF M208B ® from Dai-ichi Kogyo Seiyaku) | 10.0 |
| Ethylene glycol | 40.0 |
| Deionized water | 53.0 |
| Preservative (PROXEL ® GXL from ICI) | 2.0 |
| SUBTOTAL | 145.0 |
| Second Step |  |
| Diethylene glycol | 200.0 |
| Deionized water | 650.0 |
| TOTAL | 995.0 |

EXAMPLE 4

A red ink was prepared by utilizing a procedure analogous to that described in Example 1.

|  | Parts by Weight |
|---|---|
| First Step |  |
| C.I. Pigment Red 122 (FASTGENSUPER ® magenta RE-01 from DaiNippon Ink) | 30.0 |
| Dipolyoxyethylene nonylphenyl ether phosphate (NIKKOL DNPP-4 ® from Nikko Chemicals) | 15.0 |
| Ethylene glycol | 30.0 |
| Preservative (PROXEL GLX ® from ICI) | 2.0 |
| 48% NaOH solution | 1.0 |
| Deionized water | 72.0 |
| SUBTOTAL: | 150.0 |

|  | Parts by Weight |
| --- | --- |
| Second Step | |
| Glycerol | 200.0 |
| Ammonia | 2.0 |
| Deionized water | 648.0 |
| TOTAL: | 1000.0 |

In Examples 5 to 8, the derivatives of polyoxyethylene ether sulphate were used as a dispersant.

EXAMPLE 5

A black ink was prepared by utilizing a procedure analogous to that described in Example 1.

|  | Parts by Weight |
| --- | --- |
| First Step | |
| Carbon black (MA-100 ®, from Mitsubishi Chemical) | 40.0 |
| Polyoxyethylene laurylether sulphate (EMAL 200 ® from Kao) | 10.0 |
| Ethylene glycol | 28.0 |
| Deionized water | 50.0 |
| Preservative (PROXEL GXL ® from ICI) | 2.0 |
| SUBTOTAL: | 130.0 |
| Second Step | |
| Glycerol | 50.0 |
| Diethylene glycol | 150.0 |
| 48% NaOH solution | 1.0 |
| Deionized water | 649.0 |
| TOTAL: | 980.0 |

EXAMPLE 6

A black ink was prepared by utilizing a procedure analogous to that described in Example 1.

|  | Parts by Weight |
| --- | --- |
| First Step | |
| Carbon black (RAVAN 1255 ® from Columbian carbon) | 30.0 |
| Polyoxyethylene oleylether ammonium sulphate (HITENOL 18-E ® from Dai-ichi Kogyo Seiyaku) | 10.0 |
| Ethylene glycol | 30.0 |
| Deionized water | 80.0 |
| Preservative (PROXEL GXL ® from ICI) | 2.0 |
| SUBTOTAL: | 152.0 |
| Second Step | |
| Glycerol | 200.0 |
| Propylene glycol | 50.0 |
| Ammonia water | 1.0 |
| Deionized water | 596.0 |
| TOTAL: | 999.0 |

EXAMPLE 7

A red ink was prepared by utilizing a procedure analogous to that described in Example 1.

|  | Parts by Weight |
| --- | --- |
| First Step | |
| C.I. Pigment Red 122 (FASTOGENSUPER ® magenta RE-01 from Dainippon Ink) | 30.0 |
| Polyoxyethylene nonylphenylether ammonium sulphate (HITENOL N-08 ® from Dai-ichi Kogyo Seiyaku) | 15.0 |
| Ethylene glycol | 30.0 |
| Deionized water | 73.0 |
| Preservative (PROXEL GXL ® from ICI) | 2.0 |
| SUBTOTAL: | 150.0 |
| Second Step | |
| Glycerol | 200.0 |
| Ammonia water | 2.0 |
| Deionized water | 648.0 |
| TOTAL: | 1000.0 |

EXAMPLE 8

A blue ink was prepared by utilizing a procedure analogous to that described in Example 1.

|  | Parts by Weight |
| --- | --- |
| First Step | |
| C.I. Pigment Blue 15 (LIONOL BLUE FG-7330 ® from Toyo Ink) | 20.0 |
| Polyoxyethylene alkylether triethanolammonium sulphate (EMAL 20-T ® from Kao) | 15.0 |
| Ethylene glycol | 20.0 |
| Deionized water | 98.0 |
| Preservative (PROXEL GXL ® from ICI) | 2.0 |
| SUBTOTAL | 155.0 |
| Second Step | |
| Diethylene glycol | 200.0 |
| Ethyleneglycol dimethylether | 10.0 |
| Triethanol amine | 5.0 |
| Deionized water | 635.0 |
| TOTAL | 1005.0 |

These ink compositions had the following physical properties and characteristics as shown in the following Table.

TABLE

|  | Surface tension (dynes/cm) | Viscosity (cp, 25° C.) | pH |
| --- | --- | --- | --- |
| Example 1 | 45.0 | 1.8 | 8.7 |
| Example 2 | 43.0 | 2.0 | 8.6 |
| Example 3 | 44.0 | 2.0 | 8.5 |
| Example 4 | 44.0 | 2.3 | 8.6 |
| Example 5 | 45.0 | 1.8 | 8.8 |
| Example 6 | 46.0 | 2.0 | 8.6 |
| Example 7 | 43.0 | 2.2 | 8.6 |
| Example 8 | 46.0 | 1.8 | 8.5 |

Each of these inks has excellent dispersion stability. The dispersion stability after seven cycles of cooling to −20° C. and holding for 12 hours followed by heating at 80° C. and holding for 12 hours, was excellent.

Thus, all these inks have very good thermal stability and provide an excellent print quality as judged by "eye" producing clean, clear characters on a Hewlett Packard:DeskJet 505J-Thermal Jet System, or a Canon: BJC-820-Bubble Jet System, or an Epson:MJ-5000C-Piezoelectric System.

While several embodiments of the present invention have been shown and described, it is to be understood that many changes and modifications may be made thereunto without departing from the spirit and scope of the invention as defined in the appended claims.

What is claimed is:

1. A pigmented ink composition consisting of:
   30 parts by weight of carbon black;
   10 parts by weight of polyoxyethylene laurylether phosphate;
   28 parts by weight of ethylene glycol;
   2 parts by weight of preservative;
   50 parts by weight of glycerol;
   150 parts by weight of diethyleneglycol;
   2 parts by weight of 48% NaOH solution; and
   728 parts by weight of deionized water.

2. A pigmented ink composition consisting of:
   30 parts by weight of carbon black;
   10 parts by weight of polyoxyethylene nonylphenylether phosphate;
   30 parts by weight of ethylene glycol;
   2 parts by weight of ammonia water;
   2 parts by weight of preservative;
   200 parts by weight of glycerol;
   50 parts by weight of propylene glycol; and
   676 parts by weight of deionized water.

3. A pigmented ink composition consisting of:
   40 parts by weight of C.I. Pigment Yellow 17;
   10 parts by weight of polyoxyethylene laurylether phosphate monoethanol amine;
   40 parts by weight of ethylene glycol;
   2 parts by weight of preservative;
   200 parts by weight of diethylene glycol; and
   703 parts by weight of deionized water.

4. A pigmented ink composition consisting of:
   30 parts by weight of C.I. Pigment Red 122;
   15 parts by weight of dipolyoxyethylene nonylphenyl ether phosphate;
   30 parts by weight of ethylene glycol;
   2 parts by weight of preservative;
   1 part by weight of 48% NaOH solution;
   200 parts by weight of glycerol;
   2 parts by weight of ammonia; and
   720 parts by weight of deionized water.

5. A pigmented ink composition consisting of:
   40 parts by weight of carbon black;
   10 parts by weight of polyoxyethylene laurylether sulphate;
   28 parts by weight of ethylene glycol;
   2 parts by weight of preservative;
   50 parts by weight of glycerol;
   150 parts by weight of diethylene glycol;
   1 part by weight of 48% NaOH solution; and
   699 parts by weight of deionized water.

6. A pigmented ink composition consisting of:
   30 parts by weight of carbon black;
   10 parts by weight of polyoxyethylene oleylether ammonium sulphate;
   30 parts by weight of ethylene glycol;
   2 parts by weight of preservative;
   200 parts by weight of glycerol;
   50 parts by weight of propylene glycol;
   1 part by weight of ammonia water; and
   676 parts by weight of deionized water.

7. A pigmented ink composition consisting of:
   30 parts by weight of C.I. Pigment Red 122;
   15 parts by weight of polyoxyethylene nonylphenylether ammonium sulphate;
   30 parts by weight of ethylene glycol;
   2 parts by weight of preservative;
   200 parts by weight of glycerol;
   2 parts by weight of ammonia water; and
   721 parts by weight of deionized water.

8. A pigmented ink composition consisting of:
   20 parts by weight of C.I. Pigment Blue 15;
   15 parts by weight of polyoxyethylene alkylether triethanolammonium sulphate;
   20 parts by weight of ethylene glycol;
   2 parts by weight of preservative;
   200 parts by weight of diethylene glycol;
   10 parts by weight of ethyleneglycol dimethylether;
   5 parts by weight of triethanol amine; and
   733 parts by weight of deionized water.

* * * * *